United States Patent [19]

Moore

[11] Patent Number: 5,019,148
[45] Date of Patent: May 28, 1991

[54] HOMOGENEOUS MINERAL GRANULES BY ACID-BASE REACTION

[75] Inventor: William P. Moore, Hopewell, Va.

[73] Assignee: Agrinutrients Technology Group, Inc., Disputanta, Va.

[21] Appl. No.: 206,298

[22] Filed: Jun. 14, 1988

[51] Int. Cl.$^5$ .......................... C05G 3/00; C05G 3/06; C05G 3/10
[52] U.S. Cl. ........................................... 71/11; 71/31; 71/37; 71/42; 71/43; 71/60; 71/61; 71/63; 71/64.02; 71/64.04; 71/64.05; 71/64.06; 71/904; 426/805; 426/807
[58] Field of Search .................. 71/11, 31, 37, 42, 43, 71/60, 61, 63, 64; 426/805, 807

[56] References Cited

U.S. PATENT DOCUMENTS

| | | | |
|---|---|---|---|
| 2,047,373 | 7/1936 | Siems | 71/64.05 |
| 4,134,750 | 1/1979 | Norton et al. | 71/29 |
| 4,175,943 | 11/1979 | Jordaan et al. | 71/29 |
| 4,217,128 | 8/1980 | Stinson et al. | 71/29 |
| 4,353,730 | 10/1982 | Kinno et al. | 71/29 |

OTHER PUBLICATIONS

The fluidized Drum Granulation Process, E. Vogel Paper Presented at British Sulfur's "Nitrogen 86" conference held at Amsterdam, The Netherlands, Apr. 20–23, 1986.

*Primary Examiner*—Ferris H. Lander

[57] ABSTRACT

A stepwise method of preparing homogeneous mineral granules for agriculture by coreaction of commodity acids and bases which have properties to chemically form a transient fluid adhesive which will harden to form a strong granule binding cement. Water may be added to improve the effectiveness of the adhesive. The transient fluid adhesive is comminuted by mechanically shearing, then particulate mineral solids are admixed mechanically to form a mass of plastic globules which is rolled to form spheroid granules and the fluid adhesive hardens to form the hardened binding cement. The method provides substantially dust-free and attrition resistant animal feed supplement, and plant food fertilizer and micronutrient granules. The commodity acids and bases include aqueous and anhydrous mineral and alkyl carboxylic acids and alkali and alkaline earth bases. The mechanical means of mixing, comminuting, and formation of closely sized plastic globules is accomplished by the shear forces between two surfaces running in opposite directions at high speeds close to each other.

19 Claims, No Drawings

HOMOGENEOUS MINERAL GRANULES BY ACID-BASE REACTION

BACKGROUND OF THE INVENTION

1. Field of the Invention

This invention relates to the field of agriculture, particularly to the area of nutrients, and more particularly to granular nutrients for animals and plants. The invention provides a new method for producing homogeneous mineral granules of animal feed supplements and of plant nutrients and the new nutrient granules prepared by the method.

2. Description of the Related Art

The art of producing granules of material useful in agriculture is an old one. The general technique used in forming granules has consisted of adding sticking materials, usually liquid, to a rolling bed of relatively fine solids. The sticking material agglomerated the solids into a series of shells around a solid nucleus until the granules grew to a preselected size. Unfortunately, the technique suffers from severe limitations relating to a lack of homogeneity in both the composition and size distribution of the granules produced.

The granules using the technology of the prior art frequently vary widely in composition from granule to granule and vary even within the individual granules. The granules run different paths through a rolling granulator during formation because of their different particle sizes, particle shapes, and because of other factors. These different paths and locations of particles within a granulating mass, when the sticking material is added, usually by spraying, cause still further distortions of the granule sizes and compositions.

To obtain a close particle size range of granules for agriculture, such as plant nutrients, it is usually necessary to screen the granules produced, grind the oversize particles and recycle them, along with the undersize particles, to the granulator for further rolling with additional sticking material. The ratio of recycled material to desired size product is usually at least 3 to 1, or higher, for most granular products for agricultural, and is frequently higher than 10 to 1 when a close size range of granules is desired. Until now, it has been particularly difficult to produce small granules which are homogeneous in composition and have a close size-range without high recycle ratios. The production of substantially dust-free granules for agriculture from commodity raw materials has not been possible by any technique taught in the prior art.

In U.S. Pat. No. 4,175,943, P. J. Jordaan and J. P. Deventer provide a method of manufacturing a water soluble mixed NPK fertilizer composition in solid form. Their method first dissolves urea in aqueous phosphoric acid to form urea phosphate adduct solution, adds potassium salts to the adduct while agitating the solid or slurry, and then cools the mixture thus formed to crystallize the solid soluble fertilizer granules. When the mixture is a slurry, the constituents of the mixture are so chosen that the final product contains between 5 and 42% nitrogen, between 2 and 15% phosphorous, and between 1 and 38% potassium. It was also necessary that the pH of a 10% aqueous solution of the mixture be quite acid at between 1.2 and 2.0. Although Jordaan and Van Deventer were able to achieve a homogeneous composition, they unfortunately were required to perform the time consuming and sometimes erratic crystallization operation, and provided no teaching to allow the preparation of homogeneously size granules without screening and substantial recycling of off-sized granules.

M. M. Norton and B. R. Parket in U.S. Pat. No. 4,134,750 provide a method for preparing dust-free ammonium phosphate sulfate and urea-ammonium phosphate sulfate using a common pipe cross reactor. In their method, they produce a high temperature melt by simultaneously feeding and reacting strong ammonia, phosphoric acid, and sulfuric acid in a continuous pipe reactor. The essentially anhydrous melt is discharged into an inclined rotating drum where the melt is cooled and granulated. Drying is achieved by evaporation during the cooling step. Screening and recycle of fines and oversize granules is substantial in the teachings of Norton and Parker.

J. M. Stinson, H. C. Mann, and J. F. McCullough in U.S. Pat. No. 4,217,128 provide further teachings on the production of urea-ammonium polyphosphate from urea phosphates. In their process for high purity area-ammonium polyphosphates, solid urea orthophosphate is melted at a temperature of 260° to 350° F. and the liquid melt is agitated to discharge the carbon dioxide foam formed. The melt is held until the orthophosphate is converted to polyphosphate, which is then discharged into weak aqueous ammonia to produce an aqueous solution of high purity urea ammonium polyphosphate. Although these investigators disclosed mechanical agitation of nutrients, it was don to eliminate carbon dioxide induced foam in a high temperature ammonium phosphate intermediate for the production of liquid fertilizers.

C. B. Kinno, H. Hirayama, and T. Honda in U.S. Pat. No. 4,353,730 provided an improved granulating process wherein granular particulate material is fed to a spouting bed into which is sprayed an adherent and solidifiable liquid together with a gas steam into the spouting bed granulation zone. The priming granules are enlarged by depositing the adherent and solidifiable liquid on the surfaces. The granulation occurs by the growth of a series of pearl-like layers to make large granules from small solid particles. The enlarged granules are withdrawn as product from the last of a series of spouting bed granulation zones. Although these teachings provide for efficient cooling and drying of the granules grown, no method was taught for assuring size and composition homogeneity of the granules produced. The method assures a pearl-like layered structure in the granules, by using the spouting fluid bed.

E. Vogel, in a paper presented at British Sulfur's "Nitrogen 86" Conference in Amsterdam, The Netherlands, Apr. 20-23, 1986, disclosed a combined drum granulation and fluidized-bed process by which a liquid layer acquired by particles in the bottom of a granulating drum is solidified in a fluidized bed, mounted inside the drum, onto which the particles drop from the drum's lifting flights. This method does not disclose a way to produce granules which are homogeneous with regard to composition and size. As with other granulation methods in the art the granules are layered in structure with most layers at least somewhat different in structure. The particles are different in size because they are grown by the change meeting of granule and liquid in the bottom of the granulating drum.

The prior art literature has taught the layering of liquid on small particles of solids until that particle has grown to the desired size. These teachings lead to granules having varying compositions within the individual granules and between the various granules of the product. Because particle growth only occurs from the change meeting of the small particles with the layering material, granular particle sizes produced vary widely and the only practical way of producing a narrow range of granule particle sizes has heretofore been to use screens and product recycle.

It is an object of this invention to provide a method of producing substantially dust-free, homogeneous, mineral granules which are useful in the field of agriculture.

It is a further object of this invention to provide a method of producing mineral granules which are homogeneous enough in particle size to substantially eliminate the need for product screening and recycle.

It is a further object of this invention to provide new attrition resistant, and substantially dust-free granules of animal feed supplement compounds formed by reacting low cost commodity acids and bases by the method of this invention.

It is a still further object of this invention to provide new attrition resistant granules of plant foods formed by reacting commodity acids and bases by the method of this invention.

SUMMARY OF THE INVENTION

I have discovered a stepwise method of preparing mineral granules, useful in agriculture, by coreacting acids and base exhibiting abilities to form transient adhesives which will dry to form a hardened cement. In this method the acids and bases are comingled until they have chemically coreacted to form a transient fluid adhesive. The fluid adhesive is then comminuted by mechanical means until the fluid adhesive particles are smaller than the mineral granules to be prepared. Then, particulate mineral solids are mixed by mechanical means with the comminuted fluid adhesive to form a mass of plastic agglomerates. The order of the operation may be reversed where the particulate mineral solids are added prior to the formation and comminution of the fluid adhesive. The mass of plastic agglomerates is then rolled until it forms granules and the fluid adhesive hardens to form a cement which binds the particulate minerals together as strong mineral granules. The new method provides a method of in-situ reaction of commodity acids and bases to economically form substantially homogeneous and dust-free mineral granules for use as animal feed supplements and plant foods. Heretofore, homogeneous granule compositions have been virtually impossible to obtain and preparation of a narrow range of particle sizes has required a large amount of screening and recycle. The method of this invention overcomes these problems which have for a long time been costly to the practice of the art of granulation. The present invention not only solves those problems but makes possible the use of commodity ingredients instead of upgraded products.

DETAILED DESCRIPTION OF THE INVENTION

The improved stepwise method of preparing mineral granules for agricultural uses is started by selecting acids and bases which have properties to coreact and form transient fluid adhesives which will harden to form a strong granule-binding cement. The term "transient" is used to mean fleeting—not long lasting, and "fluid adhesive" means flowable substance which will harden to a cement.

The selected acids and bases are comingled in the method to allow them to thoroughly mix and chemically coreact to form a transient fluid adhesive. Water may be added to improve the flowability of the fluid adhesive if desirable. This adhesive is a salt formed by the coreaction of the acids and bases and may be an aqueous solution, an anhydrous melt, or a melt containing some water. The coreaction of the acids and bases is usually exothermic enough to evaporate water from the salts formed. The transient fluid adhesive may be a clear, thin liquid, but it is usually a thick, opaque viscous liquid which still contains some water.

The granulation method continues by comminuting this transient fluid adhesive, before it has hardened, by mechanical means, into particles which are smaller than the intended size of the mineral granules to be produced, to obtain an even distribution of near-equal granule sizes. Large particles of fluid adhesive produced a wide range of granule sizes in products which had poor storage properties. The comminuting, or reducing particles size, must be done by mechanical means before the fluid adhesive hardens. The comminution requires substantial amounts of shear power and is best done by the mechanical shear between two surfaces running in opposite directions close to each other. It was found that other forms of comminuting, such as fluidization with air, of spraying were not effective.

To product mineral granules for use as animal feed supplements or plant foods such as fertilizers or micronutrients, particulate mineral solids are then added and mixed with the transient fluid adhesive. It has been found advantageous at times to add the particulate minerals before the formation of the transient fluid adhesive, particularly when it is necessary to premix several different minerals to be contained in a granular product. It is also frequencyly advantageous to add water to the premixed minerals to provide for better coverage of the particles by the subsequently formed fluid adhesive. The mineral solids are finely divided particles or powders which are usually commodity ingredients such as ground lime or phosphate rock. The particulate mineral solids are best added while the fluid adhesive is maintained in its comminuted condition by mechanical shear. The continuing mechanical means blends the transient fluid adhesive and the particulate mineral solids to form a mass of homogeneous plastic agglomerates.

Rolling of the plastic agglomerates is commenced while they are still pliable and continued until the fluid adhesive has hardened to form a cement which binds the particulate minerals together as attrition resistant mineral granules. The hardening to a cement may be achieved in several ways. The first is when aqueous acids and bases are used and the exothermic heat of their coreaction evaporate sufficient water from the fluid adhesive that it dries, thereby forming a hardened cement. The second is when excess water is contained or added, external heat is applied to the system, for example, by induction of hot air, to dry and harden the fluid adhesive to a cement. The third is when a hot anhydrous melt is formed as the fluid adhesive by the reaction of acids and bases, such as superphosphoric acid and potassium hydroxide to form potassium polyphosphate. This melt must be cooled, for example, by inducing cold air, to convert the fluid adhesive to a cement.

Regardless of whether the fluid adhesive is hardened to form a strong cement by its self-generated or external heat, or by cooling, it is necessary that the rolling of the thoroughly mechanically mixed agglomerates be started while they are still plastic and continued until the fluid adhesive hardens to form a cement. The mechanical shear between the oppositely rotating surfaces force the particle sizes of the granules to stay in a narrow range and the overall size of the granules can be controlled by the proximity and speeds of the two shearing surfaces.

The method is normally a batch procedure with each operation carried out as a separate distinct step. It is frequencyly practical, however, to combine the commingling, comminuting, and admixing steps into one simultaneous operation so long as the rolling of the globules into granules is commenced while the globules are still plastic. The word "plastic" is used herein to mean easily molded or shaped. "Agglomerates" is used herein to mean materials gathered together in masses of homogeneous composition but varying in shapes and sizes.

The mechanical means of carrying out the method of this invention may be varied somewhat to fit the exigencies of available equipment but it must be sufficient in power and speed to comminute and blend the fluid adhesive with any other ingredients, such as particulate mineral solids, into homogeneous agglomerates of the desired size before the adhesive hardens and preferably achieves shear by two circularly moving surfaces moving in opposite directions in close proximity to each other.

An effective mechanical means for comminuting the transient fluid adhesive was found to be a cylindrical vessel rolling around its longitudinal axis, which contains an agitator equipped with blades rotating parallel to the vessel's rotation but in the opposite direction. The attitude of the vessel may be vertical, horizontal, or at other angles; however, near-vertical operation is usually preferred. Excellent operation of the method was found where the agitator was much smaller in diameter than the vessel, preferably between 10 and 35% of its diameter; and rotating much faster than the vessel, preferably between 20 and 100 times the revolutions per minute of the vessel. The location of the agitator was best near the wall of the vessel and near the bottom of the vessel when it is in a vertical attitude so that it can break up larger agglomerates formed near the wall of the vessel and homogeneously blend all materials passing through its shear forces to form closely sized granules. A variety of agitator shapes may be used ranging from 4 to 6 bladed flat turbine-type agitators to elaborately designed agitators to maximize the strength of the agitator. It is necessary that the agitator have a high degree of mechanical strength and resistance to attrition to have a long operating life. Stainless steel equipment, such as the rolling drum, and hardened steel agitators have been found to operate effectively in this method.

The method is normally operated batchwise but it may be successfully operated in a continuous manner where the acids, bases, water, and particulate mineral solids are added continuously for the commingling, comminuting, and admixing steps to form closely sized homogeneous agglomerates, and the agglomerates are then hardened to granules in a separate rolling apparatus. The attrition resistant homogeneous granules may then be continuously withdrawn from the rolling apparatus.

I have found that the admixing of particulate mineral solids may be deleted in the method of this invention with the attrition resistant mineral granules formed by rolling the mass of plastic agglomerates of the transient fluid adhesive until the mass hardens. This method is particularly effective when the bases are finely divided alkaline earths such as hydrated lime, magnesia, calcium oxide, calcium hydroxide, calcium carbonate, magnesium oxide, or magnesium carbonate.

Operation of the method of this invention produces hard and attrition resistant mineral granules even when the transient fluid adhesive formed by the reaction of the acids and bases provide 50% or more of the final weight of the attrition resistant granules.

To achieve smooth operation of the method while producing substantially dust-free attrition resistant granules, it is preferred that the transient fluid adhesive formed by commingling the acids and bases amount to between 25 and 50% of the attrition resistant mineral granules.

The preparation of animal feed supplements are one of the best agricultural uses of the present method, and these supplements must have sufficient purity and safety for feeding to animals. I have found that mineral acids classified as Generally Regarded As Safe (GRAS) by the Food and Drug Agency of the United States may be effectively used in the present method to produce feed supplement suitable for animal consumption.

Alkyl carboxylic acids and their salts have been reported to produce milt production increases in cows, and have been marketed for that purpose in recent years. Alkyl carboxylic acids containing between 2 and 7 carbon atoms in their skeletal chains may be used to form carboxylic acid salts for use as a cattle feed supplement. Carboxylic acids containing more than 7 carbon atoms are not reactive enough for use in the present method.

Specific acids of particular and practical value in the present method were found to be sulfuric, phosphoric, acetic, propionic, oxalic, butyric, citric, and polyphosphoric acids.

The bases suitable for commingling with the acids to form the transient fluid adhesives are primarily the alkali and alkaline each hydroxides and oxides, but may also be partially neutralized bases such as bicarbonates, carbonates, or weakly basic organic acid salts. The most widely applicable bases which are useful in this method are the oxides, hydroxides, and carbonates of the alkaline earth metals. Also found useful as bases are the carbonates, bicarbonates and hydroxides of alkali metals. The preferred bases were found to be carbonates and oxides of calcium and magnesium.

In plant food fertilizers ammonium salts are of great economic and scientific importance. In the instant method it was found that ammonia compounds could be used successfully as a base to form the required transient fluid adhesive and that the adhesive would harden to a satisfactory cement. Cement herein is used to mean a hardened material which securely holds other materials together in a combined form.

A wide variety of particulate mineral solids may be admixed with the transient fluid adhesive in the instant method so long as these solids do not adversely affect the fluid adhesive and its ability to harden. It is necessary that these mineral solids by fine enough to be readily mixed with the fluid adhesive and to form substantially homogeneous agglomerates. Powders or ground solids are suitable for this method. Particulate mineral solids found suitable for use in the instant method are compounds containing metals including calcium, magnesium, potassium, sodium, iron, cobalt and copper.

Products formed by the method of this invention were found to be effective as animal feed supplements and as plant foods such as micronutrients and fertilizers when appropriate minerals and acids and bases were used for the desired use.

The coating of granules with small amounts of various materials has been practiced with certain agricultural granules, such as ammonium nitrate, to improve their condition in storage. It has been found that between 0.5 and 4.0% of fine inert solids may be applied as a coating after the fluid adhesive has hardened in the instant method to protect the mineral granules from agglomerating during storage. Effective fine inert solids were found to include kaolin, magnesia, magnesite, limestone, and red iron oxide.

It was also found that biologically active materials beneficial to animals could be coated in the same manner as the conditioning inerts on the surface of the granules after the fluid adhesive had hardened. Vitamins are particularly effectively coated onto the mineral granules to improve their value as animal feed supplements and the preferred vitamins were vitamins A, B, $B_1$, $B_{12}$, C, D, and E.

The instant invention discloses a new economical method of preparing homogeneous mineral granules and because of its, heretofore unavailable, technique provides unique attrition resistant homogeneous plant food and animal feed supplement granule compositions. Whereas, previous plant food and animal feed supplement granules may have had similar overall chemical contents, they were not the same in physical and chemical composition because they were not homogeneous in structure and they were not made by direct coreaction of acid and base in a mechanically agitated medium.

The acids and bases used to form the fluid adhesive may be anhydrous or aqueous. These materials in commerce usually contain at least some water. The reaction is generally quite exothermic. The use of carbonate bases minimizes heat generation and produces carbon dioxide from the reaction.

When aqueous acids and bases are commingled to form an aqueous fluid adhesive, I have found that the heat of reaction evaporates water from the fluid adhesive and hardens the adhesive to form a cement. The addition of water in the commingling and admixing steps is sometimes used to improve the distribution of the fluid adhesive on the particulate minerals. When the water content is in excess of that which can be evaporated by the heat of reaction generated, the excess water must be evaporated from the fluid adhesive to form a cement with heat provided by external means, such as a stream of hot air or combustion gases.

PREFERRED EMBODIMENT OF THE INVENTION

Although the method of the instant invention allows the use of a range of operating conditions so long as the basic operating steps are carried out in the prescribed manner, a preferred method for preparing substantially dust-free animal feed supplement granules is described here. The same method may also be used for preparing plant food granules.

In the preferred method aqueous mineral acids and alkaline earth bases are commingled for between 1 and 5 minutes until they have coreacted to form a liquid salt which is a transient fluid adhesive.

The transient fluid adhesive is comminuted until fluid adhesive particles are formed which have diameters substantially smaller than the granulated product size, and then particulate mineral solids which are useful as animal feed supplements and have particle diameters between 0.03 and 1.0 millimeters are added to, and mixed with, the comminuted transient fluid adhesive until the mixed materials form a mass of plastic homogeneous agglomerates.

A shear-producing mechanical means is used to perform the commingling, comminuting and admixing operations, and this mechanical means consists of a cylindrical vessel rolling around its longitudinal axis at a rim speed of between 0.3 and 3.0 meters per second. This cylindrical vessel contains a bladed agitator with a diameter of between 20 and 35% of that of the cylindrical vessel and operates in a direction opposite to that of the cylindrical vessel at a rim speed of between 10 and 50 meters per second.

The mass of plastic agglomerate formed by the mechanical means is rolled to round out the closely sized particles until the fluid adhesive is hardened by drying at a temperature of between 80° and 135° C. to form a cement which strongly binds the particulate minerals together as homogeneous attrition resistant spheroid animal feed supplement granules.

The animal feed supplement produce made by this method is unique because of its homogeneous composition, and dust-free condition, as are plant foods prepared by the same method.

MODES OF OPERATION OF THE INVENTION

Having described the basic and preferred concepts of the instant invention, reference is now made to the following examples which illustrate the presently preferred embodiment of the invention:

EXAMPLE 1

Preparation of mineral granules of dicalcium phosphate animal feed supplement was carried out in a stainless steel 304 apparatus. The apparatus consisted of a 36-inch diameter×36-tall vessel equipped with a variable speed drive apparatus and sealing ports on the top and bottom of the vessel. The vessel contained an agitator consisting of 6 flat blades made from 3 inch high×½ inch thick hardened steel bars welded to the end of a hardened steel shaft. The bar agitator describes a diameter of 12 inches when it rotates with the bottom of the agitator located 3 inches above the floor of the vessel. Arrangements were made for the vessel to operate clockwise around its vertical axis and the agitator operating in a counterclockwise manner. The blades of the agitator operated to within about ½ inch of the rotating vessel's vertical wall. The vessel was fitted with a vent to discharge vapors and gases through a scribber and stack. The method was carried out at about atmospheric pressure with the vent maintained in the open position.

The vessel was charged with base amounting of 22.7 kilograms of commercial hydrated lime. The sealing ports of the vessel were closed, clockwise rotation of the vessel was started at 23 rpm and the agitator started in a counterclockwise rotation at 396 rpm. Commingling the acids and bases was achieved by slowly adding low fluoride furnace grade phosphoric acid containing 54% $P_2O_5$ amounting to 59.6 kilograms. Acid addition was continued for 11 minutes and during that period a transient fluid adhesive was formed and was mechanically comminuted by increasing the agitator speed to 813 rpm.

During the commingling and comminuting of the acid and base and the formation of the fluid adhesive, temperature of the coreacting materials increased from 33° to 114° C., with the exothermic heat of reaction driving water out of the mixture as steam through the vent pipe. When the comingling and comminuting was complete, the apparatus was stopped for a visual observation which showed the reaction mixture to be a thin plastic fluid still boiling off water and becoming thicker. When the agitator was restarted, observation through a glass port indicated that this plastic fluid was beat into finely divided pieces. While the plastic was becoming thick, but still pliable at 94° C., particulate mineral solids consisting of 20 kilograms of fine agricultural grade calcium carbonate was admixed with the mechanical shearing agitation still in progress. One minute after the addition of the calcium carbonate a small amount of water was added to prevent the agglomerates from becoming too dry at the still warm temperature of 85° C. The granules were allowed to harden while the vessel continued to turn for a period of 3 minutes after the water addition had ceased. The bottom port of the vessel was then opened and the granules were discharged at 80° C. by inclining the angle of the vessel's rotation.

The granules were allowed to cool and found to be quite strong. A sample was inspected and found to be substantially free of dust. Rolling the same sample in a laboratory ball mill for 15 minutes at 60 rpm showed little attrition. Screen analyses were made on the cooled granules. Seventy-five percent of the product granules were in the 10–40 U. S. Sieve size range desirable for blending in animal feeds. Microscopic examination of the material finer than 40 mesh indicated the particles to be fine granules which could be used in feed products because of the lack of dust. Thus, no recyle was deemed necessary. A total of 98% of the granules were larger than 100 mesh.

The final animal feed supplement granules were analyzed and found to contain 30.8% calcium, 21.8% phosphorous, and 3% water by weight, providing confirmation that the composition was within the U.S.P. Specification for feed grade dicalcium phosphate.

EXAMPLE 2

Preparation of a complete granular feed supplement for cattle was carried out in the apparatus of Example 1. Particulate mineral solids were weighed, charged to the apparatus and blended. Solids blended are listed as follows:

| Mineral Solids | Wt, Kilograms |
|---|---|
| Hydrated Lime | 9.50 |
| Magnesium Oxide | 1.80 |
| Limestone | 9.50 |
| Gypsum | 5.25 |
| Salt | 4.00 |
| Potassium Chloride | 13.60 |
| Water | 3.00 |
| Total | 46.65 |

After operating the vessel at a speed of 23 rpm and the agitator at a speed of 396 rpm in the opposite direction for 3 minutes the particulate mineral solids was a slightly damp, well-mixed powder at 37° C. To this mixture was added 280 grams of a micronutrient mixture containing copper, zinc, and manganese oxides which was blended for 1 minute.

With the agitator operating as above commingling and coreaction of phosphoric acid with the hydrated mineral lime and limestone bases, which had been preblended with the particulate mineral solids, was commenced at 37° C. The low-fluoride 54% $P_2O_5$ phosphoric acid amounting to 9.5 kilograms was preheated to 80° C. and added over a 2-minute period. With the agitator speed increased to 813 rpm the commingling, comminuting, and admixing were effectively combined top produce a mass of homogeneous plastic agglomerates at 111° C. One kilogram of water was added to cool the product to 82° C. and 280 grams of red iron oxide was added to the mixture as a conditioning coating and operations were continued for another 30 seconds with the agitator operating at 396 rpm. The product was then discharged from the bottom port and found after cooling to consist of rather evenly-sized red granules.

Screen analyses of the dust-free, attrition resistant granules showed 98.2% of the granules to be in the range between 8 and 100 U. S. Sieve sizes. Elemental analyses determined as weight percents on the homogeneous product granules are listed as follows:

| Ca | P | Mg | K | Na | S | Fe | Zn | Mn | Cu | $H_2O$ |
|---|---|---|---|---|---|---|---|---|---|---|
| 20.4 | 5.33 | 5.68 | 4.48 | 4.50 | 2.96 | .46 | .19 | .09 | .10 | 4.00 |

EXAMPLE 3

Preparation of milk-enhancing carboxylic acid salt-based cattle feed supplement granules was carried out in the apparatus of Example 1. This example demonstrates the sole use of acids and bases with no admixed particulate mineral solids to form homogeneous mineral granules.

To the vessel was added 21.0 kilograms of calcium oxide. The vessel was operated at 23 rpm and the agitator operated at 396 rpm while 23 kilograms of warm glacial acetic acid was pumped into the mixture at a nearly constant rate over a period of 8 minutes. During this period the acid and base were commingled until they coreacted chemically and exothermically, increasing temperature from 34° C. to 108° C. The mechanical comminuting was continued with the agitator speed at 813 rpm to produce a transient fluid adhesive which was initially a low viscosity liquid which thickened as the water was evaporated by the heat of reaction. The fluid adhesive was cooled while the mechanical shear-forces were continued until closely sized granules were formed after about 12 minutes. It was necessary to add water amounting to 5 kilograms to cool the granules quickly and secure good granule quality. The resulting granules were withdrawn from the apparatus and dried in a conventional warm air drum dryer to reduce moisture content to 2.5% by weight.

The product was found to comprise a narrow particle size range of homogeneous, water soluble granules suitable for feeding as a carboxylic acid source alone for improvement of milk production in cattle, or as an ingredient in a complete cattle feed supplement blend.

EXAMPLE 4

Preparation of a granular plant food fertilizer is demonstrated by this example using the apparatus of Example 1. To the apparatus was added 45.3 kilograms of ammonium sulfate and 4.5 kilograms of hydrated lime, 4.5 kilograms of water, and 7.5 kilograms of sulfuric acid with the vessel rotating clockwise at 23 rpm and the agitator operating at 396 rpm. The acid and base commingled and coreacted exothermically to form a transient fluid adhesive which was comminuted into fine droplets by operating the agitator at 813 rpm for 6 minutes. Then, 7.5 kilograms of commercial urea prills were added while the agitator continued to operate. The temperature increased from an original 22° C. to 65° C. The shear from the agitator operating in the opposite direction and close to the vessel wall admixed the transient fluid adhesive throughout the particulate mineral solids, particularly the ammonium sulfate, until homogeneous globules were formed. While the mass of flobules were rolling they were cooled to form cemented homogeneous granules. They were coated by adding 1 kilogram of finely ground limestone during the cooling process after the agitator was cut off and while the vessel was still operating and the granules rolling.

Seventy-seven percent of the granules were in the U. S. Sieve Mesh screen range of −5 and +20 which is desirable for fertilizer products. Storage condition of the homogeneous product was good. The product was analyzed and found to contain 20.0% N, 23.0% S, and 2.0% Urea.

I claim:

1. A stepwise method of preparing mineral granules useful in agriculture by coreacting acids and bases exhibiting abilities to form transient adhesives which will harden to form strong cements, comprising:

(a) commingling the acids and bases by mechanical means until the acids and bases have coreacted to form a transient fluid adhesive amounting to more than 25 percent of the mineral granules, the mechanical means comprising shear forces between a cylindrical vessel moving circularly around its longitudinal axis and an internal agitator rotating parallel, and in close proximity, to the vessel but in an opposite direction, the commingled acids being selected from the group consisting of sulfuric, phosphoric, polyphosphoric, acetic, propionic, oxalic, butyric, and citric acids, and the commingled bases being selected from the group consisting of calcium carbonate, calcium oxide, magnesium oxide, magnesium carbonate, ammonia alkali metal hydroxide, and alkali metal carbonate;

(b) comminuting the transient fluid adhesive, by the mechanical means used to commingle the acids and bases, until the transient fluid adhesive is reduced to particles smaller than the mineral granules to be prepared;

(c) admixing, by the mechanical means used to commingle and comminute, the transient fluid adhesive with particulate minerals useful as animal feed supplements and plant nutrients, which exhibit diameters between 0.03 and 1.0 millimeters and do not affect the ability of the fluid adhesive to harden, the admixing continuing until a mass of homogeneous plastic agglomerates are formed and forced by the mechanical means to a narrow particle size range;

(d) rolling the mass of plastic agglomerates along the wall of a cylindrical vessel, rotating around its longitudinal axis, until the fluid adhesive hardens to form a cement which binds the particulate minerals together as homogeneous attrition resistant mineral granules.

2. The method of claim 1 wherein the commingling, communiting, and admixing steps are performed simultaneously and completed before the fluid adhesive hardens to a cement.

3. The method of claim 1 wherein the mechanical means for comminuting the transient fluid adhesive comprises a cylindrical vessel, rotating around it longitudinal axis and containing an agitator equipped with blades describing a diameter amounting to between 10 to 35 percent of the diameter of the vessel, the agitator rotating parallel to the vessel's rotation but in the opposite direction and at a speed between 20 and 100 times the revolutions per minute of the vessel.

4. The method of claim 1 wherein water is added to the acids and bases to improve the binding of the particulate minerals by the cement formed from the transient fluid adhesive.

5. The method of claim 1 wherein the transient fluid adhesive formed by reaction of the acids and bases amounts to more than 50 percent of the weight of the attrition resistant mineral granules.

6. The method of claim 1 wherein the transient fluid adhesive formed by reaction of the acids and bases amounts to between 25 to 50 percent of the attrition resistant mineral granules.

7. The method of claim 1 wherein no particulate minerals are admixed with the transient fluid adhesive and attrition resistant mineral granules are formed by rolling only the mass of plastic agglomerates of the transient fluid adhesive until the mass hardens.

8. The method of claim 1 wherein the acids commingled with the bases comprise alkyl carboxylic acids containing between 2 and carbon atoms in their skeletal chains.

9. The method of claim 1 wherein the bases commingled with the acids are selected from the group of alkaline earth metal compounds consisting of oxides, hydroxides, and carbonates.

10. The method of claim 1 wherein the bases commingled with the acids are selected from the group of alkali metal compounds consisting of carbonates, bicarbonates and hydroxides.

11. The method of claim 1 wherein the particulate mineral solids are compounds containing metals selected from the group consisting of calcium, magnesium, potassium, sodium, iron, zinc, cobalt, and copper.

12. The method of claim 1 wherein the attrition resistant mineral granules formed are plant foods.

13. The method of claim 1 wherein the attrition resistant mineral granules formed are animal feed supplements.

14. The method of claim 1 wherein between 0.5 and 4.0 percent of finely divided inert solids are coatingly applied to the attrition resistant mineral granules formed after the fluid adhesive has hardened, to protect the mineral granules from agglomerating during storage, the inert solids being selected from the group consisting of kaolin, magnesia, magnesite, limestone, and red iron oxide.

15. The method of claim 1 wherein vitamins are coatingly applied to the attrition resistant mineral granules to enhance their value as animal feed supplements, the vitamins being selected from the group consisting of vitamins A, B, $B_1$, $B_{12}$, C, D, and E.

16. The attrition resistant mineral granule composition useful in agriculture prepared by the method of claim 1.

17. A batch method of preparing substantially dust-free animal feed supplement granules, comprising:
(a) commingling alkyl carboxylic acids containing between 2 and 7 carbon atoms in their skeletal chains and alkaline earth oxide bases by mechanical means for between 1 and 5 minutes until they have coreacted to form a transient fluid adhesive comprising a liquid salt and amounting to between 25 and 100 percent of the feed supplement granules;
(b) comminuting the transient fluid adhesive by mechanical means until fluid adhesive particles are formed which exhibit diameters substantially smaller than the granulated product size;
(c) admixing by mechanical means particulate commodity mineral ingredients, useful as animal feed supplements and exhibiting particle diameters between 0.03 and 1.0 millimeters, with the comminuted transient fluid adhesive until a mass of plastic homogeneous agglomerates is formed and forced by the mechanical means to a narrow particle size range;
(d) performing the commingling, comminuting, and admixing, by a shear-producing mechanical means of a cylindrical vessel rotating around its longitudinal axis at a rim speed of between 0.3 to 3.0 meters per second, the cylindrical vessel containing a bladed agitator having a diameter of between 20 and 35 percent of that of the cylindrical vessel and operating in the opposite direction at a rim speed of between 10 and 50 meters per second; and
(e) rolling the mass of plastic agglomerates until the fluid adhesive is hardened by drying at a temperature between 80 and 135° C. to form a cement which binds the particulate minerals together as attrition resistant spheroid animal feed supplement granules.

18. The animal supplement product prepared by the method of claim 17 wherein the mineral ingredients, useful as animal feed supplements, are compounds containing metals selected from the group consisting of calcium, magnesium, potassium, sodium, iron, zinc, cobalt, and copper.

19. The batch method of preparing substantially dust-free plant food granules by the method of claim 17 wherein the commodity mineral ingredients are useful as plant nutrients and are compounds containing metals selected from the group consisting of: calcium, magnesium, potassium, sodium, iron, zinc, and copper.

* * * * *